United States Patent
Davda et al.

(10) Patent No.: US 7,467,324 B1
(45) Date of Patent: Dec. 16, 2008

(54) METHOD AND APPARATUS FOR CONTINUING TO PROVIDE PROCESSING ON DISK OUTAGES

(75) Inventors: Bhavesh P. Davda, Westminster, CO (US); John F. Kelly, Lafayette, CO (US); David L. Walters, Louisville, CO (US)

(73) Assignee: Ayaya Inc., Basking Ridge, NJ (US)

( * ) Notice: Subject to any disclaimer, the term of this patent is extended or adjusted under 35 U.S.C. 154(b) by 629 days.

(21) Appl. No.: 11/006,015

(22) Filed: Dec. 6, 2004

Related U.S. Application Data

(60) Provisional application No. 60/615,304, filed on Sep. 30, 2004.

(51) Int. Cl.
*G06F 11/00* (2006.01)
(52) U.S. Cl. ............. 714/6; 714/5; 714/8; 711/162
(58) Field of Classification Search ............. 714/5, 714/6
See application file for complete search history.

(56) References Cited

U.S. PATENT DOCUMENTS

| | | | |
|---|---|---|---|
| 3,771,146 A | 11/1973 | Cotton et al. | |
| 3,882,455 A | 5/1975 | Heck et al. | |
| 4,051,461 A | 9/1977 | Hashimoto et al. | |
| 4,211,899 A | 7/1980 | Ptacnik et al. | |
| 4,356,550 A | 10/1982 | Katzman et al. | |
| 4,371,754 A | 2/1983 | De et al. | |
| 4,377,845 A | 3/1983 | Markham et al. | |
| 4,430,727 A | 2/1984 | Moore et al. | |
| 4,608,688 A * | 8/1986 | Hansen et al. | 714/6 |
| 5,680,537 A * | 10/1997 | Byers et al. | 714/5 |
| 6,189,111 B1 * | 2/2001 | Alexander et al. | 714/8 |
| 6,694,451 B2 * | 2/2004 | Atkinson | 714/15 |
| 7,216,251 B2 * | 5/2007 | Gaunt et al. | 714/6 |
| 2002/0040450 A1 * | 4/2002 | Harris et al. | 714/8 |
| 2002/0069363 A1 * | 6/2002 | Winburn | 713/200 |

* cited by examiner

*Primary Examiner*—Yolanda L Wilson
(74) *Attorney, Agent, or Firm*—Sheridan Ross P.C.

(57) ABSTRACT

A system and method for continuing to provide processing in a processing system is disclosed. In one embodiment, a processing system is provided comprising a secondary storage device, a memory, a processor, an operating system, and a plurality of processes stored in the secondary data storage device. The plurality of processes comprise a first group of processes and a second group of processes. The first group of processes is adapted to be swapped between the secondary data storage device and the memory for execution. The second group of processes is adapted to be locked into the memory of the processing system during operation. The request to lock and unlock a process is affected by a watchdog process unrelated to the process being locked. Configuration information for the watchdog process identifies the processes in the first and/or second groups.

45 Claims, 6 Drawing Sheets

METHOD AND APPARATUS FOR CONTINUING TO PROVIDE PROCESSING ON DISK OUTAGES

This application claims priority from U.S. Provisional Patent Application No. 60/615,304 filed Sep. 30, 2004, which is hereby incorporated by reference.

FIELD OF THE INVENTION

The present invention is related to a system, method and apparatus for continuing to provides processing upon a disk outage.

BACKGROUND OF THE INVENTION

Telecommunication systems process telephone services. A call processing server may be used, for example, to process calls for call center operations. Reliability of such telecommunication systems is often critical. One way of achieving reliability and fault tolerance in telecommunication systems is by duplication of call processing servers, which can be expensive. For reasons of cost, call processing servers often include simplex servers (i.e., single processor/single disk servers).

When access is lost to a disk drive (or other secondary data storage device) in simplex servers, it can lead to server failure and complete loss of telecommunication access. The server failure causes the server to stop call processing and may lead to an entire call center being shut down until the server is repaired and placed back into service. Loss of call processing services at inopportune times can have dire consequences on a call processing center. During high call volume periods, a loss of service can result in irritated customers and lost sales opportunities.

A processor may lose access to a disk drive as a result of any number of conditions that affect the chain of functional units involved in accessing a disk. For example, the disk itself may become faulty, its controlling disk file controller may fail, the channel connecting the disk memory subsystem to the processor may fail, or the direct memory access controller or disk driver that is attempting the access may fail. The failure of access may be either total failure or just an unacceptably high error rate.

U.S. Pat. No. 4,608,688 issued to Hansen et al. discloses protecting against a loss of access to both duplicated system-essential disk drives in a duplex processing system in which processes are swapped between a main memory and a pair of duplicated disks. After one of the duplicated (redundant) disks fails, the system identifies processes designed as essential to the operation of the system that are not resident in the main memory and swaps these processes into the main memory from the second duplicated disk. The system then locks all essential processes into the main memory so that they will not be swapped out of memory. In the event that the second duplicated disk also fails, the essential processes remain accessible to the processing system even upon the loss of access to both of the disks. The processing system kills non-essential processes and the system continues processing using only the essential processes. Where both of the duplicated disks of the system disclosed in the '688 patent fail simultaneously or near simultaneously, however, the essential processes are not locked into memory and the system would fail to operate.

The architecture of Hansen et al. fails to address a number of problems.

For example, it can fail to lock into memory processes that are critical or essential to providing continued call processing functionality. As will be appreciated, the difference between critical and noncritical processes is that the server is capable of continuing to provide specified features/services without access to noncritical processes but is incapable of providing the specified features/services without access to critical processes. Telecommunication software includes not only the primary call processing software, such as Avaya Inc.'s Communication Manager™, but also various software products from multiple vendors providing some of the same or a number of additional telephony features. Although the vendor of the primary call processing software can designate the processes critical to the continued provision of call processing capabilities in the event of a disk failure, determining which the criticality of processes in software of other vendors can be difficult at best. Such software often is not configured to identify which of its component processes are critical. In the event of a disk-related failure, the operating system, using first party locking techniques (in which the application or component process seeking to be locked requests the operating system to place it in a lock state), can typically lock into memory each of the critical processes in the primary call processing software but is typically unable (without alteration of source code) to determine the set of critical processes for software of other vendors.

It can fail to effect locking in a simplex server configuration. In Hansen et al., locking does not occur until loss of at least one duplicated secondary data storage devices. Upon loss of access to one of the devices, processes designated as essential to the system's operation and not resident in the main memory are swapped into the main memory from the other, still accessible, secondary data storage device. All essential processes are then locked into the main memory to prevent their removal therefrom. In contrast, a simplex server configuration commonly has only one secondary data storage device. It is not duplicated. Waiting until the device is inaccessible to effect critical process swapping and locking into main memory could prevent the system from remaining operational when the secondary data storage device is no longer accessible.

It can fail to prevent a process from becoming "hung" in the event of loss of secondary data storage disk access. As will be appreciated, a process makes read and write requests to an Integrated Device Electronics (IDE) driver for secondary disk access, and the IDE driver provides the request to the secondary disk. If the secondary disk is inaccessible, the IDE driver will futilely wait for an acknowledgment from the disk that the request is completed and thereby fail to respond to the process making the read or write request. As a result, the requesting process will be hung indefinitely and cannot be terminated.

SUMMARY OF THE INVENTION

These and other needs are addressed by the present invention. The present invention provides for continued call processing functionality during a disk outage by preserving selected call processing processes in primary memory.

In one embodiment, third party locking is used to effect locking of critical processes. Unlike first party locking in which the process to be locked or unlocked itself requests locking or unlocking, respectively, third party locking is effected by a first or "watchdog" process determining that a second unrelated process is critical or no longer critical to a desired operation or set of operations and requesting the operating system to lock or unlock, respectively, the second process in primary memory. When a process is locked in memory, it is not eligible to be swapped to the secondary data storage device. Third party locking permits critical processes of software applications of different vendors to be identified and locked without alteration of source code. The critical processes are identified in a configuration file(s) for the watchdog process. As needed, the list of critical processes in the configuration file(s) can be readily updated or otherwise modified by system administrators.

In another embodiment, an image file is used to maintain particularly critical call processing processes in primary memory. As will be appreciated, image files are typically used to preserve critical operating system processes. Expanding image files to include processes of applications other than simply processes of the operating system, such as call processing, ensures call processing survivability in the event of a disk outage.

The image file can be maintained in a RAM disk. The RAM disk is a portion of the primary memory that is allocated for use as a disk partition and is locked in memory (not swapped). The RAM disk contents are defined to support the operating system without disk access and with the necessary call processing processes locked in memory. The RAM disk contents include a set of critical binaries, scripts, and libraries in directories to support the processes locked in memory. The non-critical binaries, scripts and libraries are referenced off of the secondary data storage device. When locking occurs, all Dynamic Random Access Memory or DRAM pages that are mapped into the calling process' address space are disabled. This includes the memory pages process' text, data, stack, shared libraries, user kernel space data, and shared memory. As will be appreciated, another technique for effective locking and unlocking is to a kernel module set (or unset) the bits necessary to lock the process in the memory.

The RAM disk configuration can provide greater system reliability and continued call processing functionality notwithstanding a disk outage, even for a simplex server configuration. In the event of failure of the secondary data storage device, non-critical processes are killed and the system continues processing using only the critical processes. Unlike a duplex server configuration having replicated secondary storage, the simplex server configuration of the present invention locks critical processes in primary memory during boot up and maintains the lock status of the processes at all times during operation to ensure availability of this information to the system should access to secondary storage be lost. In contrast, in a duplex server configuration having replicated secondary storage, critical processes are locked only when one or more of the replicated secondary storage devices has failed. Otherwise, the critical processes are not locked in memory.

In yet another embodiment, a driver is configured to identify when a secondary data storage device is defective or starting to be defective (i.e., in the process of going down) and thereafter failing device access (read and/or write) requests to avoid hanging a process. A potential storage device accessibility problem is assumed by the driver to be imminent or already in existence when the driver does not receive an acknowledgment within a predetermined time after providing the corresponding request to the storage device. In that event, a device failure flag is set and all future device access requests received from processes are failed by the driver without ever sending the access request to the storage device.

DETAILED DESCRIPTION

Figure 1:
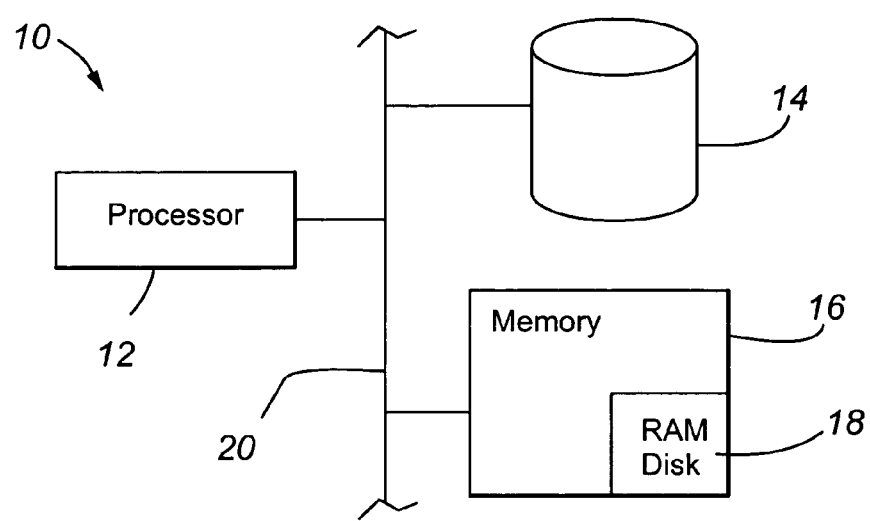
FIG. 1 shows a block diagram of one embodiment of a processing system of the present invention.

FIG. 1 shows a block diagram of one embodiment of a processing system of the present invention. As shown in FIG. 1, the processing system 10 comprises a simplex system having a single processor 12 and a secondary data storage device 14. The secondary data storage device 14 may comprise, for example, a magnetic or optical data storage device such as a drive. The processing system 10 further comprises a main memory 16. The memory 16 may comprise, for example, random access memory (RAM) or other memory devices known in the art. As will be appreciated, main memory is a relatively fast, random access, memory capable of being read or written substantially in real time. Because the main memory is relatively expensive per bit of storage space, it is commonly made only large enough to hold information that is likely to be needed by the processor 12. Compared to main memory, access to secondary storage is typically slow but is relatively inexpensive per bit of storage space. Secondary storage thus has a much larger storage capacity than main memory. Although the embodiment shown in FIG. 1 comprises a simplex system, other systems such as a duplex system may be used within the scope of the present invention.

During operation, the processor 12 operates under the control of an operating system (e.g., Linux, Unix or Windows) to execute processes assigned for execution to the processing system 10. A process comprises an instance of running an executable file. A process or task may be, for example, a user written program, or it may have a dedicated function, such as the control of an input and output device or the creation and detection of other processes. A process is generally considered to include a private data space and register values, and a set of code (i.e., program instructions) that it possibly shares with other processes. In performing its operations, the processor 12 communicates with the remaining hardware components, such as the secondary data storage device 14 and memory 16, over a bus 20.

The processing system 10 stores processes and related files in the secondary data storage device 14 and swaps them in and out of the faster, but limited, memory 16 as needed during operation. Where the secondary data storage device 14 fails, however, the processing system 10 is limited to processing operations that are loaded in the memory 16 at that time.

The present invention locks important process(es) and their related file(s) and/or directory structure(s) in the memory 16. A portion of the memory 16 is used as a virtual data storage device for storing important file(s) and/or directory structure(s) related to the processes locked in memory. For the purposes of the present invention, a file may comprise one or more file(s) and/or directory structure(s). Examples of a related file include executable files, binaries, scripts, libraries, data files, directory structures (e.g., /bin, /sbin/, /lib, /etc., /dev, etc.), and file(s) related to the operation of the important process(es) can be accessed from the virtual data storage device in the event that the secondary data storage device 14 fails.

In the embodiment of the invention shown in FIG. 1, for example, a portion of the memory 16 comprises a RAM disk 18. A RAM disk is a portion of memory that is allocated for use as a disk partition and is locked in memory (or is not eligible to be swapped). In one embodiment, the RAM disk 18 is mapped to the processing system 10 as the main secondary data storage device (i.e., the boot/root disk for the system 10), with the secondary data storage device 14 mapped to the processing system 10 as an alternative secondary data storage device. In another embodiment, however, the RAM disk 18 is mapped to the processing system 10 as an alternative secondary data storage device and the secondary data storage device 14 (or another secondary data storage device) is mapped to the processing system 10 as the main secondary data storage device (i.e., the boot/root disk for the system 10).

Critical process(es) and any related file(s) for operations important to the operation of the system are stored in the memory 16 (e.g., in the RAM disk 18 or another portion of the memory 16) and are locked into the memory 16 (e.g., in the RAM disk 18 or another portion of the memory 16) so the processor 12 will not swap them out to the secondary data storage device 14. Thus, if the secondary data storage device 14 fails, the critical process(es) and any related file(s) are still available to the processor 12 via the memory 16 (e.g., via the RAM disk 18 or another portion of the memory 16) and the processor 12 can continue to run those process(es) and access any related file(s) until the secondary data storage device 14 is repaired and placed back into service. For example, in one configuration the RAM disk contents are defined to support a limited running Linux operating system with no disk access and with the necessary call processing (e.g., Communication Manager™) processes locked in memory 16.

Figure 2:
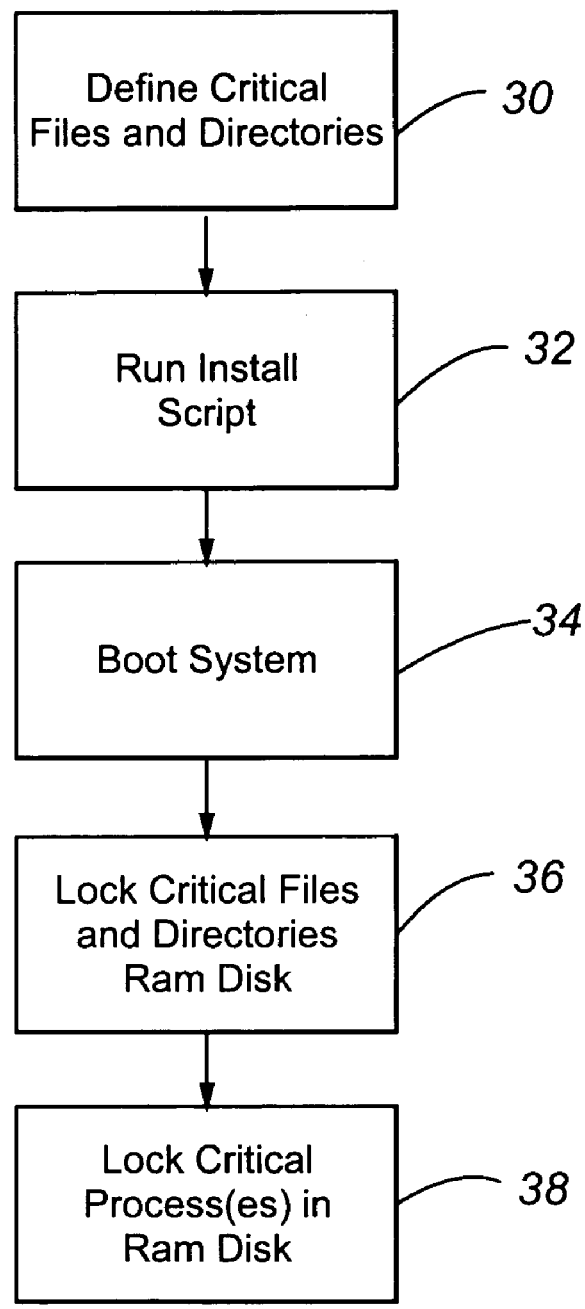
FIG. 2 shows a flow diagram of one embodiment of a method of generating a virtual data storage device for use within the present invention, wherein the virtual storage device comprises a RAM disk.

FIG. 2 shows a flow diagram of one embodiment of a process of generating a virtual data storage device for use in continuing to provide processing upon a disk outage within the scope of the present invention, wherein the virtual storage device comprises a RAM disk. In this embodiment, one or more critical process(es) and/or related file(s) are defined in operation 30. Critical process(es) and/or file(s) comprise those process(es) and/or file(s) that are critical for the processing system 10 to perform one or more desired function(s). What process(es) and/or file(s) are critical to a particular function is largely a dependent upon the application of the system 10. Whether a particular file is critical to a system is typically determined by the programmers and/or the administrators of the system 10.

In a call processing server providing call processing operations for a telecommunications call center, for example, process(es) and/or file(s) that are necessary to allow call processing operators to continue to originate and/or receive telephone calls as well as to process those calls may be defined as critical process(es) and/or file(s) for that particular operation. For example, processes and files related to specified telecommunication features, such as abbreviated dialing enhanced list, audible message waiting, vectoring, answer supervision by call classifier, ATM trunking, agent states, dial by name, DCS call coverage, echo cancellation, multifrequency signaling, wideband switching, Digital Communication System or DCS call coverage, audible message waiting, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, Vector Directory Number or VDN of origin announcement, wideband switching, wireless, logged-in agents, offer category, maximum numbers of concurrently registered IP stations, administered IP trunks, ports, and concurrently administered remote office stations/trunks, call center release, logged-in automated call distribution or ACD agents, maximum currently registered IP stations, maximum administered IP trunks, offer category, maximum number of ports, maximum number of administered remote office trunks, and maximum number of mobile stations, may be designated as critical processes and files. In the same call processing server, however, processes and applications not critical to call processing operations may be designated as non-critical and allowed to cease (or may be killed) upon a disk outage or failure. For example, any process such as system administration, error logging and the like that relies upon disk access should be designated as non-critical. In addition, other processes and files related to SNMP traps, environmental functions and the like may be designated as non-critical for such a call processing server.

Once a process and/or file is determined to be critical to a function of the processing system 10, the process or file is identified as such. In one embodiment, for example, an indicator is stored in the processing system and identifies that one or more particular process(es) and/or file(s) are critical. For example, the process control information for each process may include a field for designating whether or not a process is critical.

When the system is installed or the software is upgraded, an install script is run in operation 32. The install script is used to create an image file for use each time the system is booted after the software is installed. The install script loads software into the processing system 10 and generates a RAM disk 18. Generating a RAM disk 18, for example, may comprise generating an image file on the secondary data storage device 14. An image file comprises a file system (e.g., directory tree) within a file. Next, the installation script prepares the image file by mounting the file as if it were a file system. The installation script also copies one or more critical process(es) and/or file(s) along with its own associated metadata and other information. Then, the installation script unmounts the image file as a file system and compresses the image file. The installation script also instructs the boot loader to use the compressed image file when the system boots. The compressed image file may comprise the operating system image file to which the application-specific critical process and file information are added or may comprise a separate image file that is to be used during the boot process subsequent to the image file of the operating system. Simply put, the image file(s) include not only processes critical for the operating system but also processes critical to call processing.

After the image file is created during the installation or upgrade process, the system boots in operation 34 based on the RAM disk 18 generated by the install script in operation 32. During the system boot, the image file generated by the install script is decompressed. The decompressed image file is then loaded and locked into the memory 16 forming the RAM disk 18 in operation 36. In one embodiment, for example, any file critical to the system 10 (e.g., an executable file, a binary, a script, a library, a data file, directory structure or the like) may be loaded and locked within the RAM disk 18 of the memory 16.

Next, the system 10 locks the critical process(es) into the memory 16 (e.g., within the RAM disk 18 or another portion of the memory 16) in operation 38. Generally, smaller highly critical files not only for the operation of the operating system but also for call processing are contained in the RAM disk 18 while larger and/or less critical files are locked into other portion(s) of the memory 16. By locking the critical process(es) into memory, the process(es) remain locked in memory 16 (e.g., within the RAM disk 18 or another portion of the memory 16) and are accessible by the processor 12 in the event that the secondary data storage device 14 fails. A critical process may be locked in the memory 16 in any manner. In one embodiment, for example, one or more process(es) may themselves request the kernel to lock the first party process into memory (i.e., a first party locking procedure) into the memory 16 when they are initiated (e.g., during the booting of the system). A kernel is a central module of an operating system that loads first, stays in memory and is responsible for tasks such as memory, process, task and disk management. In this embodiment, for example, a process running in a Linux environment may call the mlockall( ) Application Programming Interface or API call when booting up to lock itself in or unlock itself from memory 16. When this API is called for locking, it disables paging for all DRAM pages that are mapped into the calling process' address space. This includes the memory pages process' text, data, stack, shared libraries, user kernel space data, and shared memory. As will be appreciated, another technique for effecting locking and unlocking is to request that the IDE driver in the kernel set (or unset) the bits necessary to lock the process in main memory.

In another embodiment, the system 10 may lock one or more critical process(es) into memory 16 (i.e., a third party locking procedure). Thus, where a process, such as a first party process, cannot be or is not modified to request the kernel to lock itself into the memory 16, a third party process or application in the system 10 may request the kernal to lock the first party process into the memory 16. In a Linux environment, for example, a Linux kernel may be modified to support a third party locking process in which a first process in the Linux operating system can request the operating system to lock another second process in memory to prevent it from being swapped out to the secondary data storage device 14.

Figure 3:
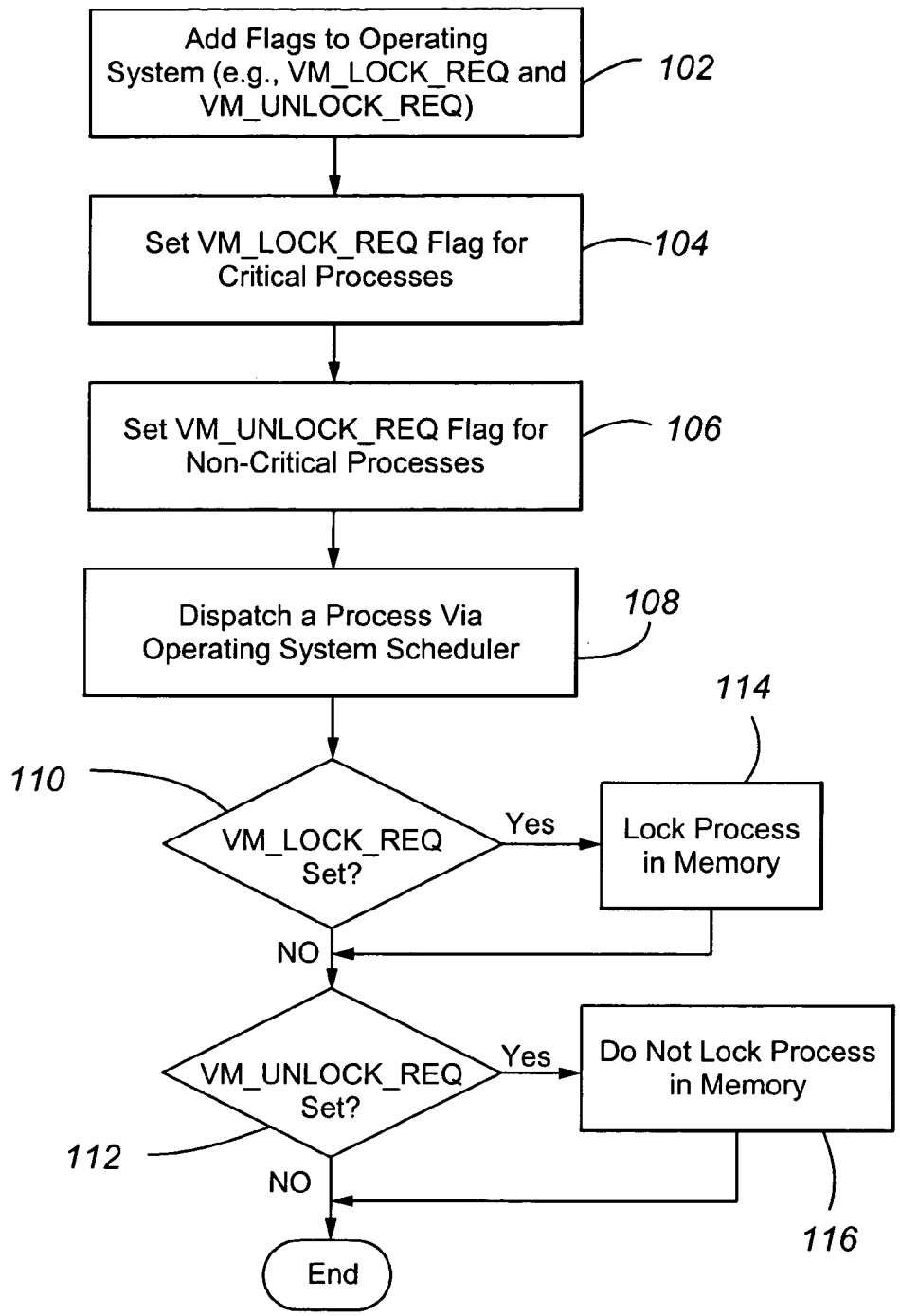
FIG. 3 shows a flow diagram of one embodiment of a method for locking a process in memory.

In the embodiment shown in FIG. 3, for example, a process 100 for a third-party locking procedure (i.e., a process other than the process to be locked requests the process to be locked in memory) is provided. In this embodiment, two new Linux virtual memory flags or state or condition indicators (e.g., VM_LOCK_REQ and VM_UNLOCK_REQ) are added to the operating system in operation 102. The virtual memory flags are then set in operations 104 and 106. In operation 104, for example, the virtual memory flag VM_LOCK_REQ is set for all critical processes of the system. As noted, a critical process (or non-critical process) is indicated by an indicator in the process code itself, in RAM disk 18, or otherwise stored in data structures in the memory 16. The virtual memory flag VM_UNLOCK_REQ is set for all non-critical processes of the system in operation 106. The flags may be set by a process during the boot of the system or may be set during the operation of the system after the boot process is complete. In one embodiment, for example, a flag for a critical process that is to be locked at all times during the operation of the system may be set during the boot of the system. A flag for a process that is only critical in certain instances (e.g., where required only if another process is operating) may be set when needed (e.g., when the other process is dispatched). Thus, a process may be given access to bit(s) of the virtual memory flag(s) such as via an (IDE) device driver using a standard system call (e.g., a Linux ioctl( ) system call).

When the process is to be dispatched by the system (e.g., by a Linux scheduler) in operation 108, the Linux scheduler may be further modified to examine the bit(s) of the virtual memory flags for a process in operations 110 and 112 when that process is being dispatched. If the process had bit(s) set in a "lock" virtual memory flag (e.g, the VM_LOCK_REQ virtual memory flag) in operation 110, the scheduler locks the task in main memory before dispatching it in operation 114. Similarly, if a task had bit(s) set in an "unlock" virtual memory flag (e.g., the VM_UNLOCK_REQ virtual memory flag) in operation 112, the scheduler unlocks (or does not lock) the task from main memory in operation 116 before dispatching it. In another embodiment, one or more bits of a single virtual memory may be set for a first configuration (e.g., lock (do not allow swapping of) the process in memory) and not set for a second configuration (e.g., unlock (allow swapping of) the process from memory). In yet another embodiment, one or more bits of a single virtual memory may be set for a first configuration (e.g., unlock (allow swapping of) the process in memory) and not set for a second configuration (e.g., lock (do not allow swapping of) the process from memory).

The ability of the system 10 or a process to lock another process into memory allows for locking processes of other vendors into memory without having to alter the party process or source code for the process itself. For example, where source code to a process is not available or where it is undesirable to modify the process (e.g., where future versions would require repeated modification of the third party processes), the process may still be locked into memory without having to alter the process itself. In this embodiment, only a single application process needs to be maintained in order to lock processes of other vendors. In addition, the single application process needs only the Process ID of the other vendor's application in order to lock it into memory. In one embodiment, for example, critical process(es) native to the system 10 may lock themselves into the memory 16 when they are initiated, and the system 10 may lock critical process(es) into the memory 16 without having to alter the process(es) themselves.

Figure 4:
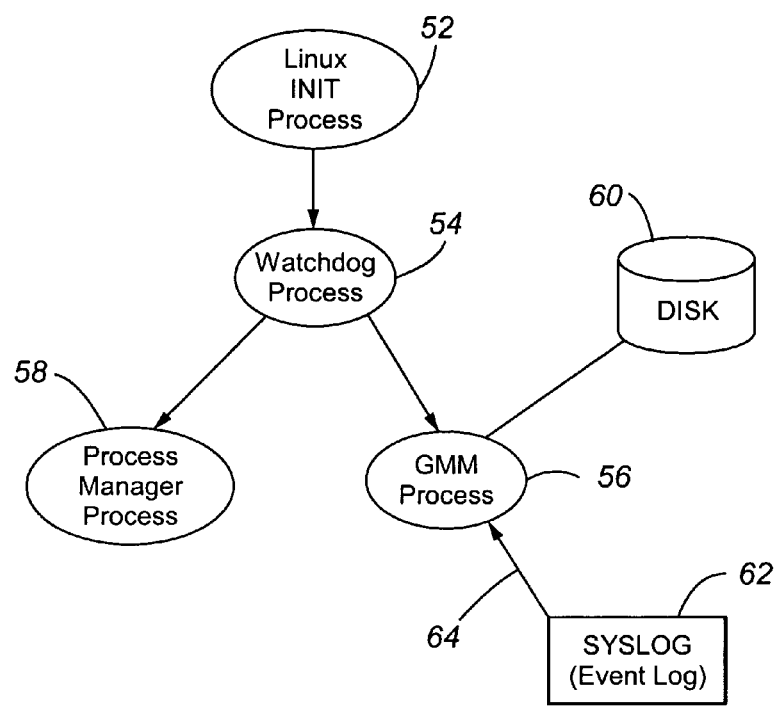
FIG. 4 shows a block diagram of one embodiment of a group of processes running in a processing system operating under the control of a Linux operating system.
Figure 5:
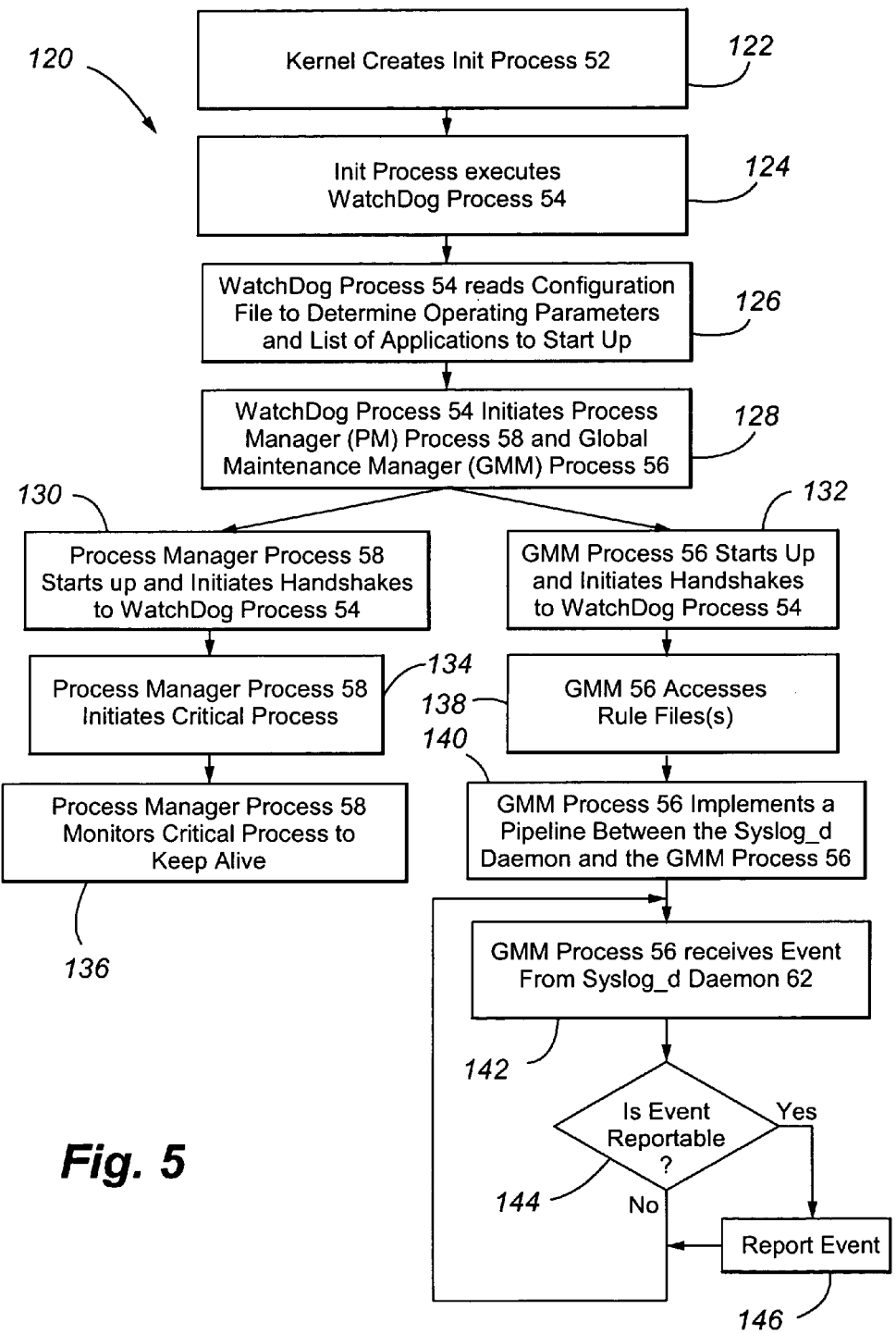
FIG. 5 shows a flow diagram of the operation of the processes shown in FIG. 4.

FIG. 4 shows a block diagram of one embodiment of processes running in a processing system operating under the control of a Linux operating system. FIG. 5 shows a flow diagram of the operation of the processes shown in FIG. 4. As shown in FIG. 5, the Linux kernel creates an init or initiation process 52 (shown in FIG. 4) that creates the remaining processes for the system in operation 122. The init process 52 executes a "watchdog" process 54 to run on the system in operation 124. The watchdog process 54 reads its configuration file to determine operating parameters and applications to start up in operation 126. The watchdog process 54 further effects third party locking of critical processes identified in the configuration file. The watchdog process 54 then creates, monitors for sanity and recovers a process manager (PM) process 56 (e.g., a communication manager™ process) and a global maintenance manager process (GMM) 56 in operation 128.

The applications initiated by the watchdog process (e.g., the global maintenance manager (GMM) process 56 and the process manager (PM) process 58) start up and begin sending regular handshakes to the watchdog process (e.g., as an "I'm alive" signal or a "heartbeat" signal) in operations 130 and 132. The process manager (PM) process 58 initiates the critical (e.g., call processing) processes in operation 134 and initiates first party locking of those processes in main memory. The process manager (PM) process 58 also controls the initialization of the critical processes and invokes recovery actions in response to the errors reported by the processes to keep the critical processes alive in operation 136.

The global maintenance manager (GMM) process 56 provides alarm reporting services for platform and maintenance. The global maintenance manager (GMM) process 56, for example, implements a maintenance process. Upon initiation, the global maintenance manager (GMM) process 56 accesses one or more rule file(s) (e.g., an alarm rules file) located on disk drive 60 (or elsewhere in the processing system 10) in operation 138. The global maintenance manager (GMM) process 56 further implements a pipeline 64 between the syslog_d daemon 62 and the global maintenance manager (GMM) process 56 in operation 140 so that events to the syslog file 62 are also immediately sent to the global maintenance manager (GMM) process 58 for analysis in operation 142. The global maintenance manager (GMM) process 56 compares each event to a list of alarms read in from an alarm rules file in operation 144, and if matched, reports the alarm in operation 146.

Figure 6:
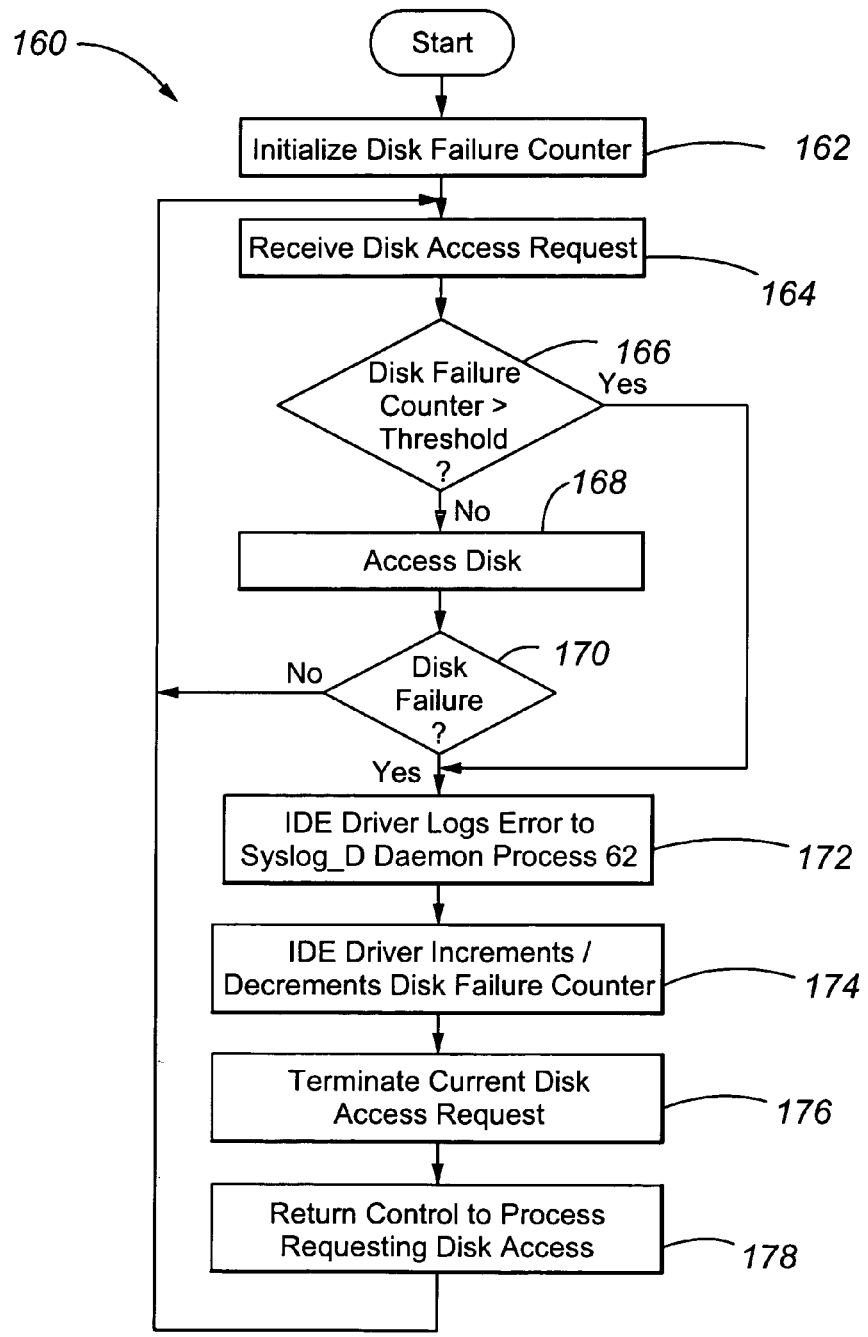
FIG. 6 shows a flow diagram of one embodiment of a method for returning control to a process requesting data storage device access upon a disk failure.

FIG. 6 shows an embodiment of a method 160 for determining a data storage device (e.g., a disk) failure and performing operations to prevent the failure from hanging a process attempting to access the data storage device. Typically, when a process is attempting to access a disk drive, a device driver for the disk issues a request and waits for a response. When no response from the disk is returned, the device driver "hangs" and is not accessible for future disk access requests. In the present invention, however, a flag is used to determine if the disk has already failed and, if so, returns control to the process without submitting a request to the disk.

In this embodiment, the Linux kernel IDE driver code is altered to use a failure flag to indicate that the processing system has detected the disk drive 60 to have failed. In operation 162, the method first initializes a counter or flag (e.g., a disk_failure counter or a disk_failure flag) for determining whether a disk failure has been detected. When a request for access to the disk is made, the kernel IDE driver receives the request in operation 164. The kernel IDE driver then determines whether the disk_failure counter is greater than or equal to a predetermined threshold (e.g., one) or whether a disk_failure flag has been set (or a disk_fully_operational flag has been unset) in operation 166. If the disk_failure counter is greater than or equal to the predetermined threshold (e.g., one) or the disk_failure flag has been set (or the disk_fully_operational flag has been unset), the method proceeds to operation 172 discussed below. If, however, the disk_failure counter is not greater than or equal to the predetermined threshold (e.g., one) or the disk_failure flag has not been set (or the disk_fully_operational flag has not been unset) in operation 166, the kernel IDE driver submits the request to accesses the disk in operation 168 and waits for a response. If a response is not received within a predetermined period of time (such as 10 milliseconds), for example, the IDE driver determines that a disk failure or malfunction has occurred. Where no disk failure has been detected (and the disk access has completed successfully), the method reverts to operation 164 to wait for the next disk access request. Where a disk error is detected in operation 170, however, the Linux kernel IDE driver code logs the error (e.g., "command given to failed disk") to the syslog_d daemon process 62 in operation 172 and sets a disk_failure flag (or unsets a disk_fully_operational flag) and increments the disk_failure counter in operation 174. The current disk access request is terminated in operation 176, and control is returned to the process that is currently blocked from accessing the disk input/output (I/O) in operation 178. Then, the method returns to operation 164, where the kernel IDE driver waits for the next disk access request.

In this manner, the process that attempted to access the disk drive 60 does not remain blocked. By returning control to the process, this embodiment provides a significant advantage over the standard Linux operating system, where the IDE driver would indefinitely block the I/O request from the process and thereby effectively hang the process. In a high-availability system, it can be critical for certain real-time processes to not block on the I/O for an indefinite period of time so that they can continue processing their real-time task.

In one embodiment, for example, the global maintenance manager (GMM) process 56 utilizes a Linux IOCTL interface to set a flag when the processing system has detected the disk drive 60 to have failed. In this embodiment, the global maintenance manager (GMM) process 56 uses the Linux IOCTL interface to access the following values in the kernel IDE driver.

define HDIO_GET_FAIL 0x0338
define HDIO_SET_FAIL 0x0339

When the HDIO_GET_FAIL command is used, the command returns the value of the disk failure flag. The HDIO_SET_FAIL command allows the process to set the failure value. In one embodiment, the HDIO_SET_FAIL command may be used in testing the system by setting the disk failure flag to simulate a disk failure.

When the error is logged to the syslog process 62, the global maintenance manager (GMM) process 56 receives the error log from the pipeline 64 (described above) between the global maintenance manager (GMM) process 56 and the syslog process 62. When the error is received by the global maintenance manager (GMM) process 56, a set of rules is used to generate a set of recovery actions including informing the watchdog process 54 to shut down various non-critical processes. Thus, any errors reported by the Linux kernel IDE driver can be determined by the global maintenance manager (GMM) process 54 to be an indication of a disk failure, and the global maintenance manager (GMM) process 54 can take a recovery action in order to continue providing service in the event of the failure.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

For example, although examples of the present invention have been described with reference to a Linux operating system and for a simplex server having a single secondary data storage device, the present invention is not limited to this particular implementation. The system may operate under an operating system such as Linux, Unix, Windows or the like. Further, the system may comprise a simplex server, a duplex server or other system architectures. In addition, although system of the present invention has been described with reference to a call processing system for maintaining call processing operations when a data storage device such as a disk drive fails, the present invention is also applicable to other applications as would be readily recognized by one of ordinary skill in the art.

What is claimed is:

1. A processing system, comprising:
a secondary data storage device having a plurality of processes stored on the secondary data storage device, the plurality of processes comprising a first group of processes and a second group of processes;
a primary memory operable to store the first group of processes and the second group of processes, the first group of processes being adapted to be swapped between the secondary data storage device and the memory for execution, and the second group of processes being adapted to be locked in the primary memory during the operation of the processing system;
a processor operable to execute the plurality of processes out of at least one of the secondary data storage device and the primary memory and to swap the first group of processes between the secondary data storage device and the primary memory; and
a first process operable to determine that a second process, in the second group of processes, is critical to at least one selected operation and request an operating system of the processing system to lock the second process in memory.

2. The system of claim 1, wherein the operating system is operable to determine that a third process is critical; generate an image file including the third process; and store the image file in a RAM disk portion of primary memory, wherein the third process is associated with an application other than the operating system.

3. The system of claim 1, wherein the at least one selected operation comprises call processing.

4. The system of claim 1, wherein the first process is further operable to determine that a third process is not critical, the third process having previously been locked in primary memory as being critical, and to request the operating system to unlock the third process from primary memory.

5. The system of claim 1, wherein the determining operation comprises setting a lock flag, the lock flag being associated with the second process.

6. The system of claim 1, wherein the determining operation comprises setting an unlock flag, the unlock flag being associated with the third process.

7. The system of claim 1, further comprising:
a driver operable to receive a request from a third process to access the secondary storage device; provide the third process' request to the secondary storage device; when a response to the request is not received from the secondary storage device within a predetermined time, determine that the disk is inaccessible; and return a fail message to the third process.

8. The system of claim 7, wherein the driver is operable to perform one of (a) setting a failure flag and (b) unsetting an accessible flag to indicate that the disk is not currently accessible.

9. The system of claim 7, wherein the driver is further operable, when a fourth process requests access to the disk, to determine that the one of (a) a failure flag is set and (b) an accessible flag is unset; not provide the request to the disk; and return a fail message to the fourth process.

10. The system of claim 1, wherein the first process determining, requesting and locking operations are performed as part of a boot sequence.

11. The system of claim 1, further comprising:
a virtual data storage device allocated out of at least a portion of the memory in which at least one file related to the second group of the processes is locked into the virtual data storage device so that if the secondary data storage device fails, the at least one related file is accessible to the processor from the virtual data storage device.

12. The system of claim 11, wherein the second group of processes is locked into the memory during a boot operation of the processing system.

13. The system of claim 11, wherein the virtual data storage device comprises a RAM disk.

14. The system of claim 1, wherein at least one of the second group of processes is locked into the memory upon an initiation of the at least one of the second group of processes.

15. The system of claim 1, wherein the second group of processes comprises an indicator associated with the second group of processes identifying the second group of processes as critical processes.

16. The system of claim 1, wherein the first group of processes comprises an indicator associated with the first group of processes identifying the first group of processes as non-critical processes.

17. The system of claim 1, wherein the processing system comprises a simplex server.

18. In a processing system comprising a processor, a primary memory and a secondary data storage device, a method, comprising:
determining, by a first process, that a different second process is critical to a desired operation;
the first pro requesting, by the first process, an operating system kernel to lock the second process in primary memory; and
in response thereto, locking, by the operating system kernel, the second process in memory.

19. The method of claim 18, further comprising:
determining that a third process is critical;
generating an image file including the third process; and
storing the image file in a RAM disk portion of primary memory, wherein the third process is associated with an application other than the operating system.

20. The method of claim 18, wherein the desired operation is call processing.

21. The method of claim 18, further comprising:
the first process determining that a third process is not critical, the third process having previously been locked in primary memory as being critical;
the first process requesting the operating system kernel to unlock the third process from primary memory; and
in response thereto, the operating system kernel unlocking the third process from primary memory.

22. The method of claim 21, wherein the determining step comprises setting an unlock flag, the unlock flag being associated with the third process.

23. The method of claim 18, wherein the determining step comprises setting a lock flag, the lock flag being associated with the second process.

24. The method of claim 18, further comprising:
a third process requesting access to a disk;
a driver receiving the request from the third process and providing the request to the disk;
when a response to the request is not received from the disk within a predetermined time, the driver determining that the disk is inaccessible; and
the driver returning a fail message to the third process.

25. The method of claim 24, wherein in the driver determining step one of a failure flag is set and an accessible flag is unset to indicate that the disk is not currently accessible.

26. The method of claim 24, further comprising:
a fourth process requesting access to the disk;
the driver determining that the one of a failure flag is set and an accessible flag is unset; and
the driver not providing the request to the disk and returning a fail message to the fourth process.

27. The method of claim 18, wherein the first process determining and requesting and locking steps are performed as part of a boot sequence.

28. The method of claim 18, wherein the processor is a simplex processor.

29. A computer readable medium comprising processor executable instructions to perform the steps of claim 18.

30. A logic circuit operable to perform the steps of claim 18.

31. In a processing system comprising a processor, a primary memory and a secondary data storage device, a method, comprising:
a first process requesting access to the secondary data storage device;
a driver receiving the request from the first process and providing the request to the secondary data storage device;
when a response to the request is not received from the device within a predetermined time, the driver determining that the device is inaccessible; and
the driver returning a fail message to the first process;
a second process determining that a third process is critical;
the second process requesting an operating system kernel to lock the third process in primary memory; and
in response thereto, the operating system kernel locking the third process in memory.

32. The method of claim 31, further comprising:
determining that a fourth process is critical;
generating an image file including the fourth process; and
storing the image file in a RAM disk portion of primary memory, wherein the fourth process is associated with an application other than the operating system.

33. The method of claim 32, wherein the application is call processing.

34. The method of claim 31, further comprising:
the second process determining that a fourth process is not critical, the fourth process having previously been locked in primary memory as being critical;
the second process requesting the operating system kernel to unlock the fourth process from primary memory; and
in response thereto, the operating system kernel unlocking the fourth process from primary memory.

35. The method of claim 31, wherein the second process determining step comprises setting a lock flag, the lock flag being associated with the third process.

36. The method of claim 31, wherein the second process determining step comprises setting an unlock flag, the unlock flag being associated with the fourth process.

37. The method of claim 31, wherein the second process determining and requesting and locking steps are performed as part of a boot sequence.

38. A computer readable medium comprising processor executable instructions to perform the steps of claim 31.

39. A logic circuit operable to perform the steps of claim 31.

40. In a processing system comprising primary memory and an unduplicated secondary data storage device, a method, comprising:
(a) partitioning, by a processor, a portion of the primary memory;
(b) determining, by the processor, that a selected process is critical to a desired operation; and
(c) locking, by the processor, the selected process in the primary memory, thereby preventing the selected process from being swapped between the primary memory and the secondary data storage device.

41. The method of claim 40, wherein the locking step (c) is performed while access to the secondary data storage device is still available and wherein the secondary data storage device comprises an indicator indicating that the selected process is critical.

42. The method of claim 40, wherein step (a) comprises the sub-steps:
(A1) creating, by an install script and in the secondary data storage device, an image file for use during system booting;
(A2) preparing, by the install script, the image file, said preparing including copying the selected process into the image file and mounting the image file;
(A3) unmounting the image file as a file system;
(A4) compressing the unmounted image file; and
(A5) instructing a boot loader to use the compressed image file in system boots, wherein the compressed image file is stored in the partitioned memory portion.

43. The method of claim 40, wherein the locking step comprises the sub-step:
(C1) requesting a kernel of an operating system to lock the selected process in primary memory.

44. The method of claim 40, wherein the locking step comprises the sub-step:
(C1) disabling paging for DRAM pages that are mapped into the selected process' address space in primary memory.

45. The method of claim 40, wherein the locking step comprises the sub-step:
(C1) requesting a driver in a kernel of the operating system to set or unset bits necessary to lock the selected process in primary memory.

* * * * *

UNITED STATES PATENT AND TRADEMARK OFFICE
CERTIFICATE OF CORRECTION

PATENT NO. : 7,467,324 B1
APPLICATION NO. : 11/006015
DATED : December 16, 2008
INVENTOR(S) : Davda et al.

Page 1 of 1

It is certified that error appears in the above-identified patent and that said Letters Patent is hereby corrected as shown below:

On the title page item (73), should read:

Avaya Inc., Basking Ridge, NJ (US)

Signed and Sealed this

Twenty-ninth Day of September, 2009

David J. Kappos
*Director of the United States Patent and Trademark Office*